United States Patent
Stanhope et al.

(10) Patent No.: US 11,864,484 B2
(45) Date of Patent: Jan. 9, 2024

(54) SYSTEM AND METHOD FOR DETERMINING SOIL CLOD SIZE OR RESIDUE COVERAGE OF A FIELD DURING A NON-SOIL-WORKING OPERATION

(71) Applicant: CNH Industrial Canada, Ltd., Saskatoon (CA)

(72) Inventors: Trevor Stanhope, Palos Hills, IL (US); James W. Henry, Saskatoon (CA)

(73) Assignee: CNH Industrial Canada, Ltd., Saskatoon (CA)

( * ) Notice: Subject to any disclaimer, the term of this patent is extended or adjusted under 35 U.S.C. 154(b) by 896 days.

(21) Appl. No.: 16/675,919

(22) Filed: Nov. 6, 2019

(65) Prior Publication Data
US 2021/0127553 A1    May 6, 2021

(51) Int. Cl.
| | |
|---|---|
| A01B 79/00 | (2006.01) |
| G01B 11/24 | (2006.01) |
| G01B 15/04 | (2006.01) |
| A01C 23/00 | (2006.01) |
| A01F 15/07 | (2006.01) |

(52) U.S. Cl.
CPC ............ *A01B 79/005* (2013.01); *G01B 11/24* (2013.01); *G01B 15/04* (2013.01); *A01C 23/00* (2013.01); *A01F 15/07* (2013.01)

(58) Field of Classification Search
CPC combination set(s) only.
See application file for complete search history.

(56) References Cited

U.S. PATENT DOCUMENTS

| | | | |
|---|---|---|---|
| 4,823,268 | A | 4/1989 | Giles et al. |
| 5,995,895 | A | 11/1999 | Watt et al. |
| 6,389,785 | B1 | 5/2002 | Diekhans et al. |
| 7,640,721 | B2 | 1/2010 | Viaud et al. |
| 8,488,874 | B2 | 7/2013 | Zaman et al. |

(Continued)

FOREIGN PATENT DOCUMENTS

DE    10204941    8/2003

OTHER PUBLICATIONS

Crossingham, Ryan, "TruSet Tillage Technology Available on More Models in 2018," Farm & Ranch Guide, published Jan. 31, 2018.

(Continued)

*Primary Examiner* — Md N Haque
(74) *Attorney, Agent, or Firm* — Rebecca L. Henkel; Rickard K. DeMille

(57) ABSTRACT

In one aspect, a system for determining soil clod size or soil surface residue coverage of a field may include an agricultural implement configured to perform a non-soil-working operation on the field as the agricultural implement is towed across the field. Furthermore, the system may include a non-contact-based sensor installed on the agricultural implement, with the non-contact-based sensor configured to capture data indicative of at least one of a soil clod size of the field or a soil surface residue coverage of the field. Additionally, a controller of the disclosed system may be configured to receive data from the non-contact-based sensor as the agricultural implement is moved across the field. Moreover, the controller may be configured to determine at least one of the soil clod size of the field or the soil surface residue coverage of the field based on the received data.

12 Claims, 5 Drawing Sheets

(56) References Cited

U.S. PATENT DOCUMENTS

| | | |
|---|---|---|
| 9,510,508 B2 | 12/2016 | Jung |
| 9,930,834 B2 | 4/2018 | Chaney et al. |
| 10,117,374 B2 | 11/2018 | Boydens et al. |
| 10,188,025 B2 | 1/2019 | Kirk et al. |
| 2015/0247835 A1* | 9/2015 | Trovat .................. G01N 33/24 702/2 |
| 2015/0354961 A1 | 12/2015 | Reinecke et al. |
| 2018/0128933 A1* | 5/2018 | Koch ..................... G01S 13/02 |
| 2019/0059209 A1 | 2/2019 | Brune et al. |
| 2019/0343033 A1* | 11/2019 | Whitney ............... E02F 9/2296 |
| 2021/0243939 A1* | 8/2021 | Strnad .................. A01B 63/008 |

OTHER PUBLICATIONS

Kirk, Kendall, "Hay Production Precision," Hay & Forage Grower, Apr./May 2017, p. 14.

Mathanker, S.K., et al., "Sensing Miscanthus Swath Volume for Maximizing Baler Throughput Rate," American Society of Agricultural and Biological Engineers, vol. 57, Issue 2, 2014, pp. 355-362.

* cited by examiner

SYSTEM AND METHOD FOR DETERMINING SOIL CLOD SIZE OR RESIDUE COVERAGE OF A FIELD DURING A NON-SOIL-WORKING OPERATION

FIELD OF THE INVENTION

The present disclosure generally relates to agricultural implements and, more particularly, to systems and methods for determining soil clod size or soil surface residue coverage of a field as an agricultural implement configured to perform a non-soil-working operation is moved across the field.

BACKGROUND OF THE INVENTION

It is well known that, to attain the best agricultural performance from a piece of land, a farmer must cultivate the soil, typically through one or more tillage operations. Common tillage operations include plowing, harrowing, and sub-soiling. Modern farmers perform these tillage operations by pulling a tillage implement behind an agricultural work vehicle, such as a tractor. Depending on the crop selection and the soil conditions, a farmer may need to perform several tillage operations at different times over a crop cycle to properly cultivate the land to suit the crop choice.

When performing tillage operations, it is desirable to create a level and uniform layer of tilled soil across the field to form a proper seedbed for subsequent planting operations. As such, it may be necessary to adjust the operation of the agricultural implement field conditions vary across the field. In this respect, systems have been developed to automatically determine various characteristics (e.g., soil profile/levelness, soil clod size, residue coverage, and/or the like) of the field. However, further improvements to such systems are needed.

Accordingly, an improved system and method for determining soil clod size or soil surface residue coverage of a field would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a system for determining soil clod size or soil surface residue coverage of a field. The system may include an agricultural implement configured to perform a non-soil-working operation on the field as the agricultural implement is towed across the field. Furthermore, the system may include a non-contact-based sensor installed on the agricultural implement, with the non-contact-based sensor configured to capture data indicative of at least one of a soil clod size of the field or a soil surface residue coverage of the field. Additionally, the system may include a controller communicatively coupled to the non-contact-based sensor. As such, the controller may be configured to receive data from the non-contact-based sensor as the agricultural implement is moved across the field. Moreover, the controller may be configured to determine at least one of the soil clod size of the field or the soil surface residue coverage of the field based on the received data.

In another aspect, the present subject matter is directed to an agricultural implement. The agricultural implement may include a frame and a tool supported on the frame, with the tool configured to perform a non-soil-working operation on a field as the agricultural implement is towed across the field. Furthermore, the agricultural implement may include a non-contact-based sensor configured to capture data indicative of at least one of a soil clod size of the field or a soil surface residue coverage of the field. Additionally, the agricultural implement may include a controller communicatively coupled to the non-contact-based sensor. As such, the controller may be configured to receive data from the non-contact-based sensor as the agricultural implement is moved across the field. Moreover, the controller may be configured to determine at least one of the soil clod size of the field or the soil surface residue coverage of the field based on the received data.

In a further aspect, the present subject matter is directed to a method for determining soil clod size or soil surface residue coverage of a field. The method may include receiving, with the one or more computing devices, non-contact-based sensor data as the agricultural implement is moved across the field. Furthermore, the method may include determining, with the one or more computing devices, at least one of the soil clod size of the field or the soil surface residue coverage of the field based on the received data. Additionally, the method may include generating, with the one or more computing devices, a field map based on the determined at least one of the soil clod size or the soil surface residue coverage.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
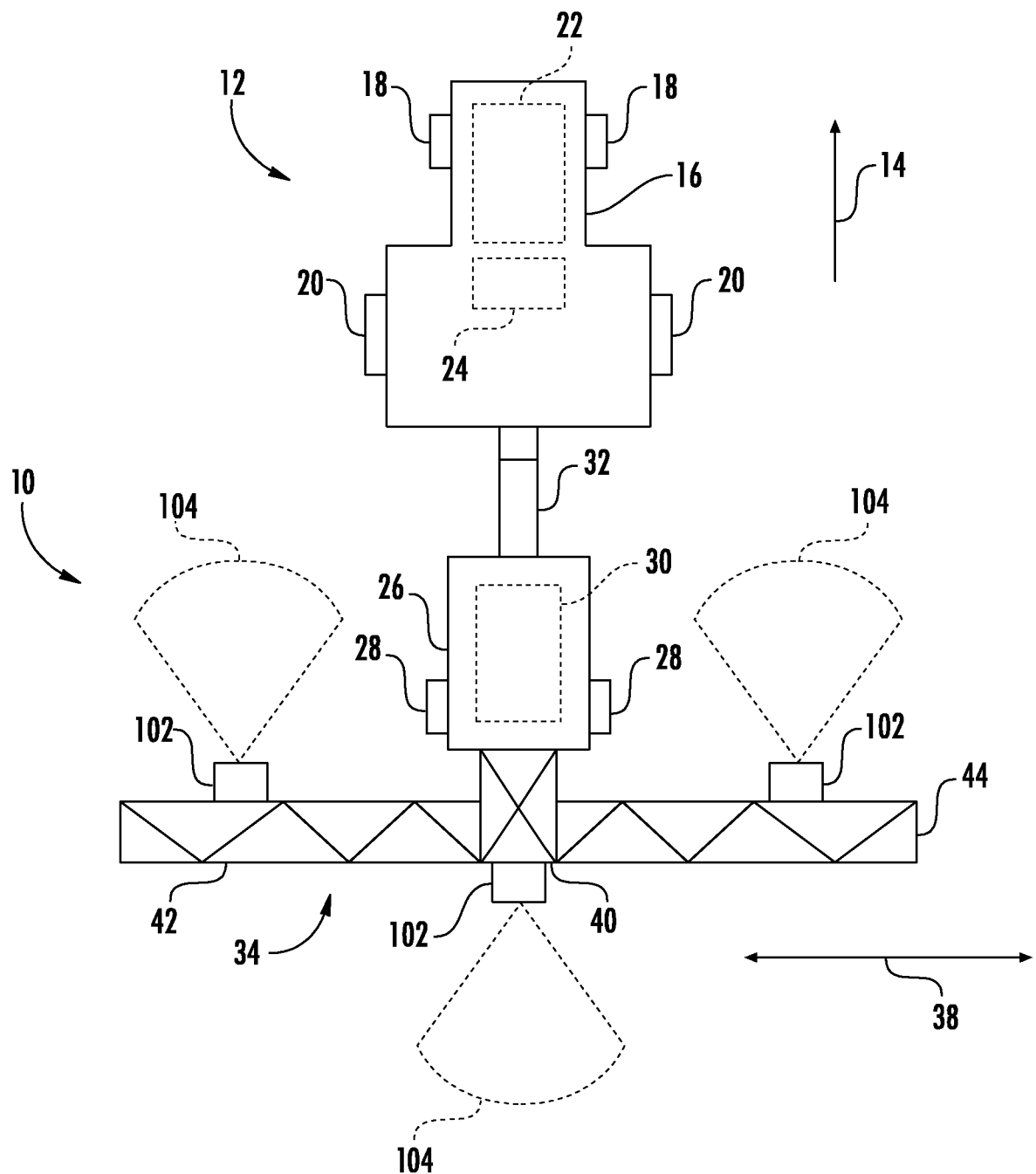
FIG. 1 illustrates a top view of one embodiment of an agricultural implement configured to perform a non-soil-working operation on a field in accordance with aspects of the present subject matter, particularly illustrating the implement configured as a sprayer being towed by an associated work vehicle.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for determining the soil clod size or soil surface residue coverage of a field. Specifically, in several embodiments, the system may include an agricultural implement configured to perform a non-soil-working operation on the field as the implement is towed across the field by an associated work vehicle. For example, in one embodiment, the implement may correspond to a sprayer configured to perform a spraying operation of the field. In another embodiment, the implement may correspond to a baler configured to perform a baling operation on the field. In this respect, as the implement is moved across the field, a controller of the disclosed system may be configured to receive data from one or more non-contact-based sensors (e.g., a vision-based sensor(s) or a RADAR sensor(s)) installed on the implement. As such, the controller may be configured to determine the soil clod size of the field and/or the soil surface residue coverage of the field based on the received data. Thereafter, the controller may be configured to generate a field map(s) providing the determined soil clod size and/or soil surface residue coverage values at various locations across the field. Additionally, in one embodiment, the controller may be configured to transmit the determined soil clod size and/or the soil surface residue coverage generated value(s) and/or the generated field map(s) to a remote device(s) (e.g., a remote database server) for use during a subsequent agricultural operation (e.g., a tillage operation).

Figure 2:
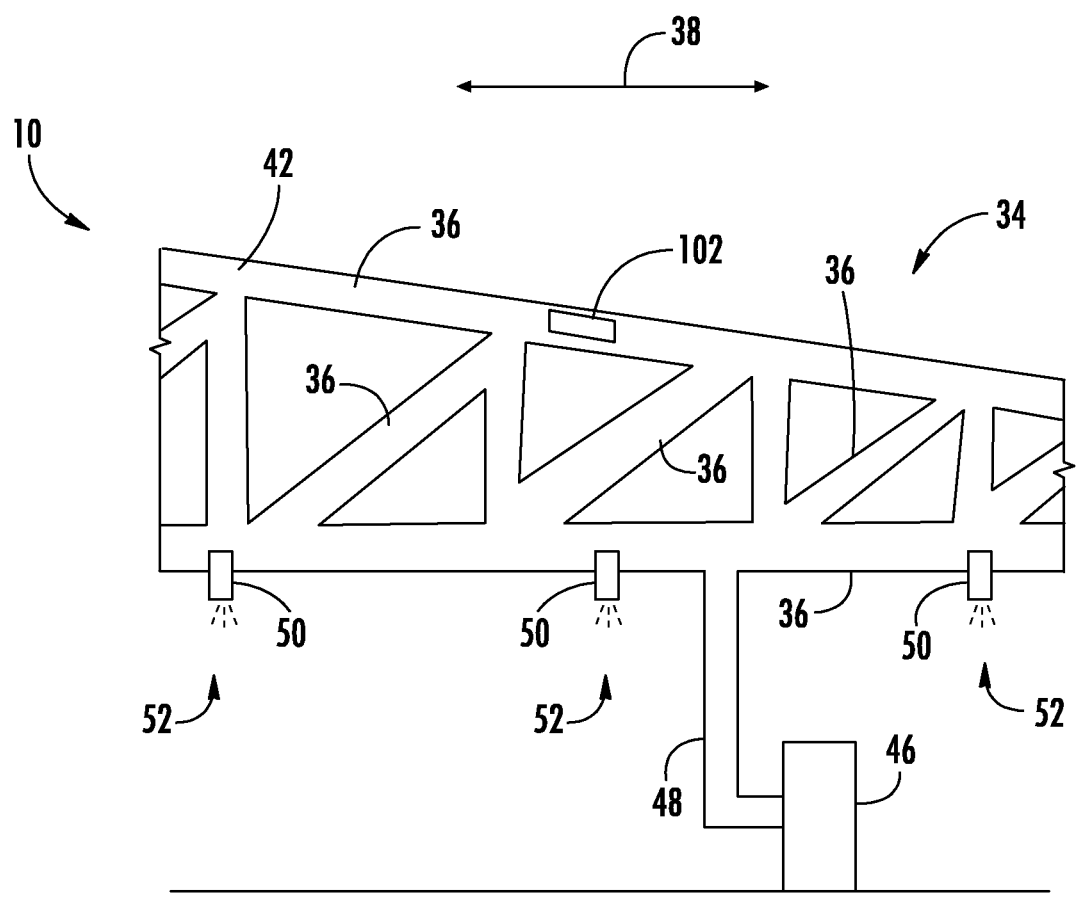
FIG. 2 illustrates a partial, front view the agricultural implement shown in FIG. 1, particularly illustrating various components of the implement.

Referring now to drawings, FIGS. 1 and 2 illustrates differing views of one embodiment of an agricultural implement 10 configured to perform a non-soil-working operation on a field in accordance with aspects of the present subject matter. Specifically, FIG. 1 illustrates a top view of one embodiment of the implement 10 coupled to a work vehicle 12. FIG. 2 illustrates a partial, front view the implement 10, particularly illustrating various components of the implement 10.

Figure 3:
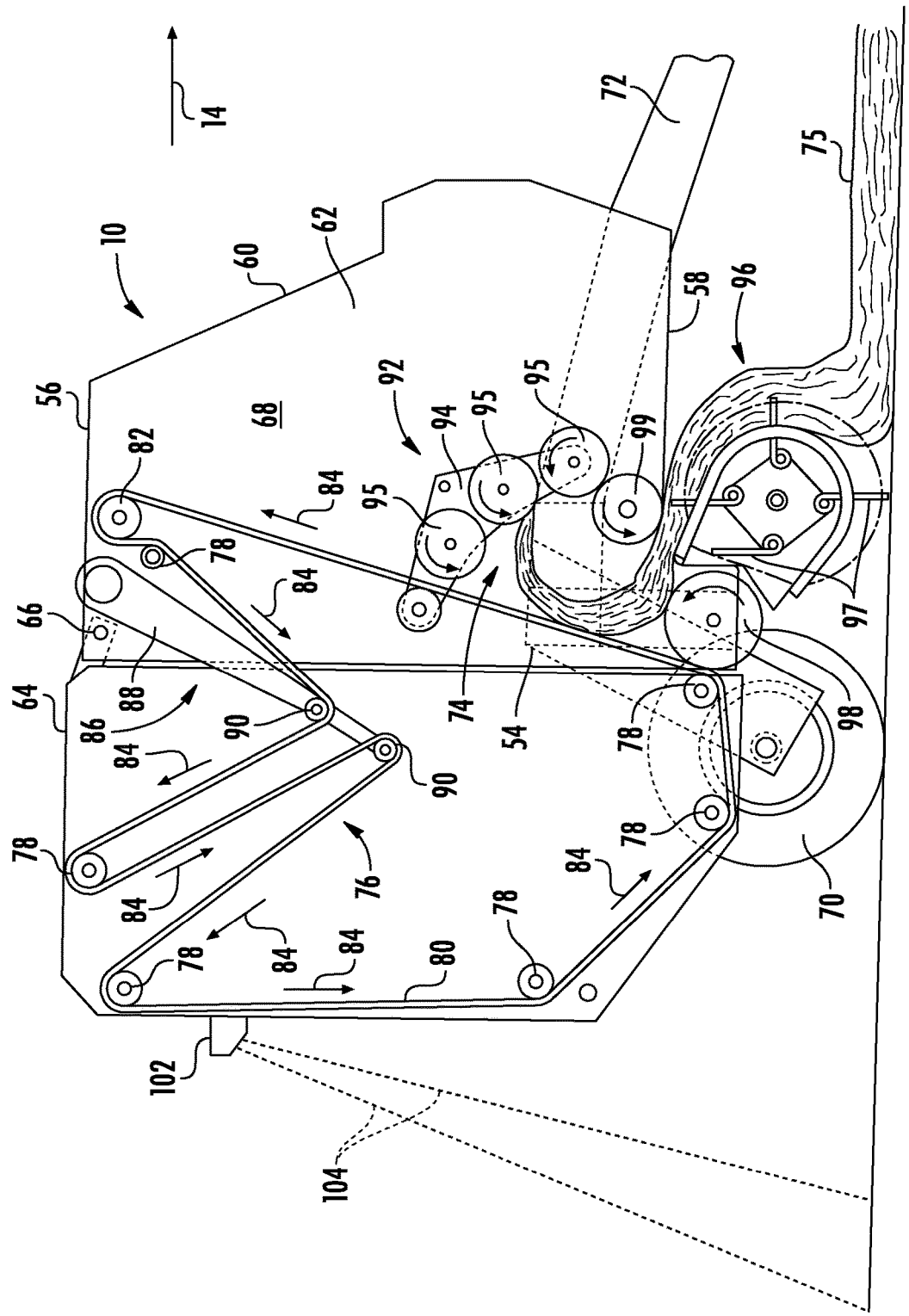
FIG. 3 illustrates a cross-sectional side view of another embodiment of an agricultural implement configured to perform a non-soil-working operation on a field in accordance with aspects of the present subject matter, particularly illustrating the implement configured as a baler.

In general, the implement 10 may be configured to perform the non-soil-working operation on the field while being towed across the field by the vehicle 12 in a direction of travel (e.g., as indicated by arrow 14). As shown, in the illustrated embodiment, the implement 10 is configured as a sprayer and the vehicle 12 is configured as an agricultural tractor. In such an embodiment, the implement 10 may be configured to perform a spraying operation on the field as the vehicle 12 tows the implement 10 across the field in the direction of travel 14. However, as will be described below, in other embodiments, the implement 10 may also be configured as a baler (FIG. 3).

As shown in FIG. 1, the vehicle 12 may include a frame or chassis 16 configured to support or couple to a plurality of components. For example, a pair of steerable front wheels 18 and a pair of driven rear wheels 20 may be coupled to the chassis 16. The wheels 18, 20 may be configured to support the vehicle 12 relative to the ground and move the vehicle 12 in the direction of travel 14 across the field. As such, the vehicle 12 may include an engine 22 and a transmission 24 mounted on the chassis 18. The transmission 24 may be operably coupled to the engine 22 and may provide variably adjusted gear ratios for transferring engine power to the driven rear wheels 20 via a drive axle assembly (not shown) (or via axles if multiple drive axles are employed).

Moreover, as shown in FIG. 1, the implement 10 may include a frame 26 configured to support or couple to a plurality of components. For example, a pair of wheels 28 may be coupled to the frame 26 and configured to support the implement 10 relative to the ground. As such, the wheels 28 may allow the vehicle 12 to tow the implement 10 across the field in the direction of travel 14. Furthermore, the frame 26 may support a tank 30 configured to store or hold an agricultural substance, such as a pesticide, a fungicide, a rodenticide, a herbicide, a fertilizer, or a nutrient. As will be described below, the agricultural substance stored in the tank 30 may sprayed or otherwise dispensed onto the field as the implement 10 is towed across the field by the vehicle 12. Additionally, a hitch assembly 32 may be connected to the frame 26 and configured to couple the implement 10 to the vehicle 12.

Furthermore, as shown in FIGS. 1 and 2, the implement 10 may include a boom assembly 34 coupled to and/or supported on the frame 26. In general, the boom assembly 34 may include a plurality of structural frame members 36, such as beams, bars, and/or the like. Specifically, in several embodiments, the boom assembly 34 may extend outward from the frame 26 in a lateral direction (e.g., as indicated by arrow 38 in FIG. 1), with the lateral direction 38 extending perpendicular to the direction of travel 14. For example, in one embodiment, the boom assembly 34 may include a center boom section 40 coupled to the frame 26 and a pair of wing boom sections 42, 44 extending outwardly from the center boom section 40 in the lateral direction 38. Additionally, in one embodiment, one or more wheels 46 may be coupled to the boom assembly 34 by one or more suitable wheel mounts 48 to support the boom assembly 34 relative to the ground. However, in alternative embodiments, the boom assembly 34 may include any other suitable configuration. For example, in one embodiment, the boom assembly 34 may include a different number of boom sections, such as a single boom section, a pair of boom sections, or four or more boom sections.

As shown in FIG. 2, the boom assembly 34 may be configured to support a plurality of nozzles 50 configured to dispense an agricultural substance 52 onto the underlying field and/or plants. Specifically, in several embodiments, the nozzles 50 may be mounted on and/or coupled to the frame members 36 of the boom assembly 34, with the nozzles 50 being spaced apart from each other along the lateral direction 38. Furthermore, various components (not shown), such as fluid conduits, valves, pumps, and/or the like, may be configured to transfer the agricultural substance 52 from the tank 30 to the nozzles 50. In this respect, as the implement 10 travels across the field in the direction of travel 14 to perform a spraying operation thereon, the nozzles 50 may be configured to dispense or otherwise spray the agricultural substance 52 stored in the tank 30 onto the underlying field (and/or plants). For example, in certain instances, the spraying operation may be performed after a harvesting operation and prior to the subsequent tillage and planting operations. In such instances, the nozzles 46 may be configured to dispense an herbicide onto the underlying plants (e.g., the weeds) or fertilizer/nutrients onto the underlying ground. However, the spraying operation may be performed at any other suitable time, such as after a tillage operation and prior to the subsequent planting operation or after a planting operation and prior to the subsequent harvesting operation.

Referring now to FIG. 3, a cross-sectional side view of another embodiment of the agricultural implement 10 configured to perform a non-soil-working operation on a field is illustrated in accordance with aspects of the present subject matter. Like the embodiment of the implement 10 shown in FIGS. 1 and 2, the implement 10 shown in FIG. 3 may be configured to perform a non-soil-working operation on the field while being towed across the field (e.g., by the vehicle 12 shown in FIG. 1) in the direction of travel 14. However, in the embodiment illustrated in FIG. 3, the implement 10 is configured as a baler. In such an embodiment, the implement 10 may be configured to perform a baling operation on the field as the implement 10 is towed across the field in the direction of travel 14. However, in alternative embodiments, the implement 10 may be configured as any other suitable implement configured to perform a non-soil-working operation on a field.

As shown, the implement 10 may include a frame 54 configured to be coupled to or support a plurality of components. For example, in several embodiments, the frame 54 may support a top wall 56, a bottom wall 58, a forward wall 60, and a pair of side walls 62 (one is shown). A tailgate 64 may be pivotably coupled to aft ends of the side walls 62 via a pair of stub shafts 66. Furthermore, a pair of wheels 70 (one is shown) may be coupled to the frame 54 and configured to support the implement 10 relative to the ground. As such, the wheels 70 may allow the implement 10 to be towed across the field in the direction of travel 14 by the vehicle 12. Additionally, a tongue or hitch assembly 72 may be connected to the frame 54 and configured to couple the implement 10 to the vehicle 12.

Furthermore, the implement 10 may include a plurality of components positioned within an internal chamber 68 of the implement 10 defined by the various walls 56, 58, 60, 62 and the tailgate 64. In general, such components may be configured to form a bale (e.g., a cylindrical bundle) of crop materials 75 within a bale-forming portion 74 of the internal chamber 68. For example, in several embodiments, the implement 10 may include an apron 76 positioned within chamber 68. Specifically, in several embodiments, the apron 76 may include a plurality of guide rollers 78 and a plurality of laterally spaced apart continuous belts 80 (one is shown) that are supported by and rotationally engage the guide rollers 78. As such, a drive roller 82 may rotationally drive the belts 80 about a path (e.g., as indicated by arrows 84 in FIG. 3) defined by the guide rollers 78. Moreover, a take-up assembly 86 may allow the path 84 of the belts to vary as the size of the bale within the bale-forming portion 74 changes. For example, in one embodiment, the take-up assembly 86 may include a pair of pivotable take-up arms 88 (one is shown) and a pair of rollers 90 extending between the arms 88. The rollers 90 may, in turn, engage the belts 80 such that the rollers 90 partially define the path 84 of the belts 80. As will be described below, the take-up arms 88 may be pivoted as the size of bale changes, thereby changing the position of the rollers 90 and, thus, the path 84 of the belts 80 to accommodate the growing bale.

Additionally, in several embodiments, the implement 10 may include a sledge assembly 92 positioned within the internal chamber 68. Specifically, in one embodiment, the sledge assembly 92 may include a pair of spaced apart sledge arms 94 (one is shown) and a plurality of sledge rollers 95 extending laterally between the arms 94. As will be described below, the rollers 95 may be rotationally driven relative to the sledge arms 94, which, in combination with the rotation of the belts 80 of the apron 76, may form a bale of crop material 75 within the bale-forming portion 74. Moreover, the implement 10 may include a pickup 96 rotatably coupled to the frame 54, with the pickup 96 including a plurality of fingers or tines 97 configured to lift the crop material 75 from the surface of the field. Furthermore, a floor roller 98 and a starter roller 99 may receive the crop material 75 from the pickup 96 and deliver the crop material 75 to the bale-forming portion 74.

As mentioned above, the implement 10 may be configured to perform a baling operation on the field. More specifically, as the implement 10 is moved across the field in the direction of travel 14, the pickup 96 may rotate such that the tines 97 sweep or otherwise lift the crop material 75 off the field surface. The floor roller 98 and the starter roller 99 may receive the crop material 75 from the pickup 97 and deliver such crop material 75 to the bale-forming portion 74 of the internal chamber 68. Thereafter, the belts 80 of the apron 76 may direct the crop material 75 upwardly and forwardly within the bale-forming portion 74 such that the crop material 75 engages the sledge assembly 92. The sledge assembly 92 may, in turn, direct the crop material 75 downwardly and rearwardly within the bale-forming portion 74, thereby coiling the crop material 75 in a manner that forms a bale. As additional crop material 75 is fed into the bale-forming portion 74, the diameter of the bale may grow. In this respect, the take-up arms 88 may pivot upwardly and rearwardly, thereby allowing the crop material engaging portion of the belts 80 to move rearwardly to accommodate the increasing size of the bale. Once the bale has reached its desired or maximum size, the tailgate 64 may be lifted and the bale may be discharged from the implement 10.

It should be further appreciated that the configuration of the agricultural implement 10 and the work vehicle 12 described above and shown in FIGS. 1-3 is provided only to place the present subject matter in an exemplary field of use. Thus, it should be appreciated that the present subject matter may be readily adaptable to any manner of implement and/or vehicle configuration.

Additionally, as shown in FIGS. 1-3, the implement 10 may include one or more non-contact-based sensors 102 coupled thereto and/or supported thereon for capturing data associated with the field as a non-soil-working operation is being performed via the implement 10. Specifically, in several embodiments, the non-contact-based sensor(s) 102 may be provided in operative association with the implement 10 such that the non-contact-based sensor(s) 102 has a field of view (e.g., as indicated by dashed lines 104 in FIGS. 1 and 3) directed towards a portion(s) of the field disposed in front of, behind, and/or along one or both of the sides of the implement 10 as the implement 10 is being towed across the field. As such, the non-contact-based sensor(s) 102 may capture data from the implement 10 of one or more portion(s) of the field being passed by the implement 10.

In general, the non-contact-based sensor(s) 102 may correspond to any suitable device(s) configured to capture data of the soil surface of the field that allows the soil clod size and/or the soil surface residue coverage of the field to be identified. Specifically, in several embodiments, the noncontact-based sensor(s) 102 may correspond to a vision-based sensor(s), such as a Light Detection and Ranging ("LIDAR") sensor(s) (e.g., a LIDAR scanner(s)). In such embodiments, non-contact-based sensor(s) 102 may be configured to output light pulses from a light source (e.g., a laser outputting a pulsed laser beam) and detect the reflection of each pulse off the soil surface. Based on the time of flight of the light pulses, the specific location (e.g., 2-D or 3-D coordinates) of the soil surface relative to the non-contact-based sensor(s) 102 may be calculated. By scanning the pulsed light over a given swath width, the soil clod size and/or the soil surface residue coverage may be detected across a given section of the field. Thus, by continuously scanning the pulsed light along the soil surface as the implement 10 are moved across the field, a plurality of single data point scan lines may be generated that includes soil clod size and/or the soil surface residue coverage data for all or a portion of the field. Alternatively, the vision-based sensor(s) may correspond to any other suitable vision system(s) capable of capturing vision or image-like data that allows the soil clod size and/or the soil surface residue coverage of the field to be identified. For example, in one embodiment, the vision-based sensor(s) may correspond to a camera(s).

In another embodiment, the non-contact-based sensor(s) 102 may correspond to a Radio Detection and Ranging ("RADAR") sensor(s). Specifically, in such an embodiment, the non-contact-based sensor(s) 102 may be configured to emit one or more radio wave and/or microwave output signals directed toward a portion of the field surface within the corresponding field of view or sensor detection zone. A portion of the output signal(s) may, in turn, be reflected by soil surface of the field as echo signal(s). Moreover, the non-contact-based sensor(s) 102 may be configured to receive the reflected echo signal(s). In this regard, the time of flight, amplitude, frequency, and/or phase of the received echo signal(s) may be indicative of the soil clod size and/or the soil surface residue coverage of the field. However, in alternative embodiments, the non-contact-based sensor(s) 102 may be configured as any other suitable type of sensor (s) configured to capture soil clod size and/or the soil surface residue coverage data of the field, such as an ultrasonic sensor(s).

The non-contact-based sensor(s) 102 may be installed at any suitable location(s) on the implement 10. For example, as shown in FIG. 1, in one embodiment, a non-contact-based sensor 102 may be coupled to the front of each wing boom section 42, 44 of the implement 10 such that each non-contact-based sensor 102 has a field of view 104 that allows it to capture data of an adjacent area or portion of the field disposed in front and/or underneath of the corresponding wing boom section 42, 44. Similarly, another non-contact-based sensor 102 may be coupled to the rear of the center boom section 40 of the implement 12 such that the non-contact-based sensor 102 has a field of view 104 that allows it to capture data of an adjacent area or portion of the field disposed underneath and/or aft of the center boom section 40. Furthermore, as shown in FIG. 3, in another embodiment, a non-contact-based sensor 102 may be may be coupled to the rear of the tailgate 64 of the implement 10 such that the non-contact-based sensor 102 has a field of view 104 that allows it to capture data of an adjacent area or portion of the field disposed in behind of the the implement. However, in alternative embodiments, the non-contact-based sensor(s) 102 may be installed at any other suitable location(s) on the implement 10 that allows the non-contact-based sensor(s) 102 to capture data of the field across which the implement 10. Furthermore, the implement 10 may include any other suitable number of non-contact-based sensor(s) 102, such as two non-contact-based sensors 102 or four or more non-contact-based sensors 102.

Figure 4:
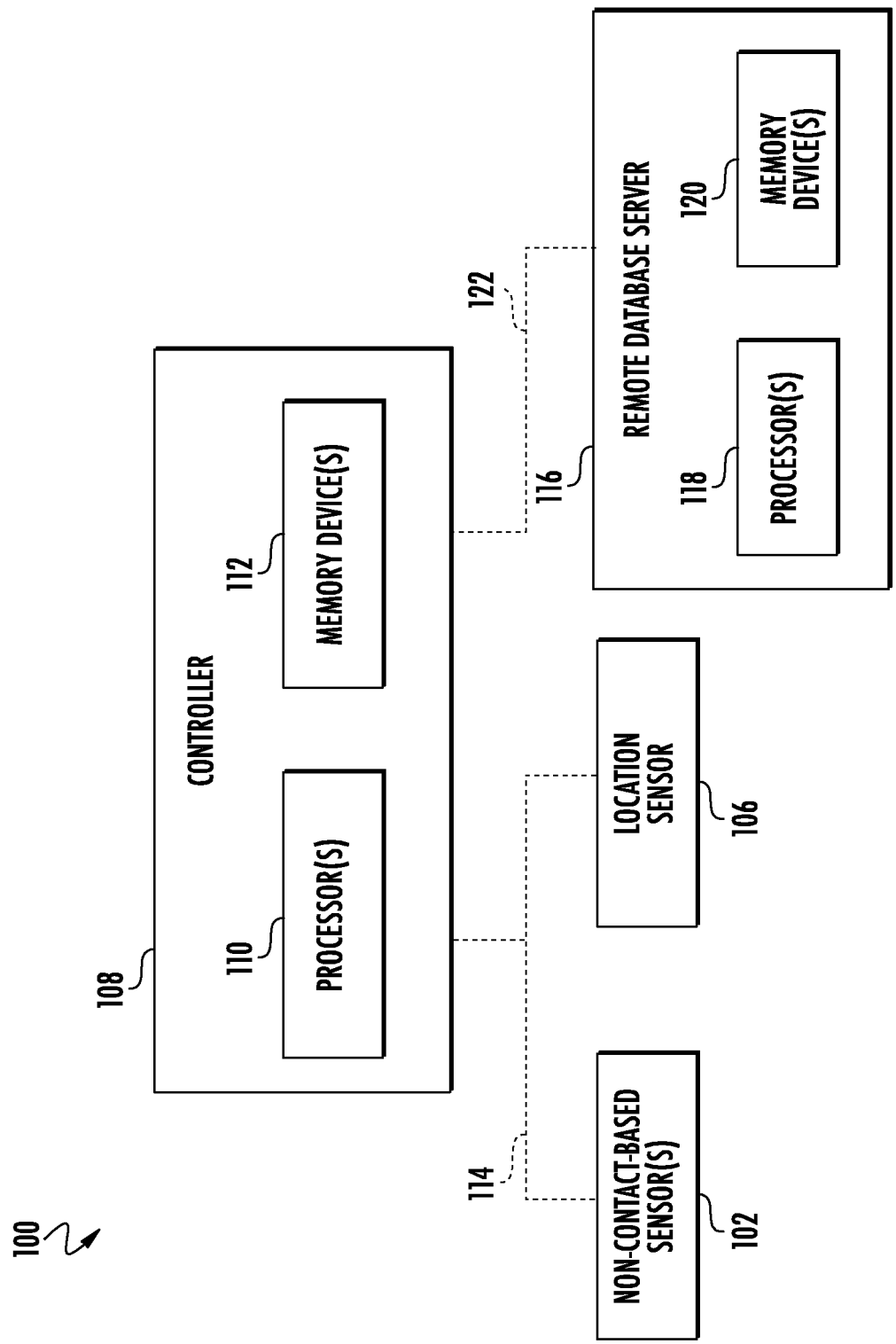
FIG. 4 illustrates a schematic view of one embodiment of a system for determining the soil clod size or soil surface residue coverage of a field in accordance with aspects of the present subject matter.

Referring now to FIG. 4, a schematic view of one embodiment of a system 100 for determining the soil clod size or soil surface residue coverage of a field is illustrated in accordance with aspects of the present subject matter. In general, the system 100 will be described herein with reference to the agricultural implement 10 and the work vehicle 12 described above with reference to FIGS. 1-3. However, it should be appreciated by those of ordinary skill in the art that the disclosed system 100 may generally be utilized with agricultural implements having any other suitable implement configuration and/or work vehicles having any other suitable vehicle configuration.

As shown in FIG. 4, the system 100 may include a location sensor 106 may be provided in operative association with the implement 10 and/or the vehicle 12. In general, the location sensor 106 may be configured to determine the current location of the implement 10 and/or the vehicle 12 using a satellite navigation positioning system (e.g. a GPS system, a Galileo positioning system, the Global Navigation satellite system (GLONASS), the BeiDou Satellite Navigation and Positioning system, and/or the like). In such an embodiment, the location determined by the location sensor 106 may be transmitted to a controller(s) of the implement 10 and/or the vehicle 12 (e.g., in the form coordinates) and stored within the controller's memory for subsequent processing and/or analysis. For instance, based on the known dimensional configuration and/or relative positioning between the implement 10 and the vehicle 12, the determined location from the location sensor 102 may be used to geo-locate the implement 10 within the field.

In accordance with aspects of the present subject matter, the system 100 may include a controller 108 positioned on and/or within or otherwise associated with the implement 10 or the vehicle 12. In general, the controller 108 may comprise any suitable processor-based device known in the art, such as a computing device or any suitable combination of computing devices. Thus, in several embodiments, the controller 108 may include one or more processor(s) 110 and associated memory device(s) 112 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 112 of the controller 108 may generally comprise memory element(s) including, but not limited to, a computer readable medium (e.g., random access memory (RAM)), a computer readable non-volatile medium (e.g., a flash memory), a floppy disc, a compact disc-read only memory (CD-ROM), a magneto-optical disc (MOD), a digital versatile disc (DVD), and/or other suitable memory elements. Such memory device(s) 112 may generally be configured to store suitable computer-readable instructions that, when implemented by the processor(s) 110, configure the controller 108 to perform various computer-implemented functions.

In addition, the controller 108 may also include various other suitable components, such as a communications circuit or module, a network interface, one or more input/output channels, a data/control bus and/or the like, to allow controller 108 to be communicatively coupled to any of the various other system components described herein (e.g., the non-contact-based sensor(s) 102 and the location sensor 106). For instance, as shown in FIG. 4, a communicative link or interface 114 (e.g., a data bus) may be provided between the controller 108 and the sensors 102, 106 to allow the controller 108 to communicate with such sensors 102, 106 via any suitable communications protocol (e.g., CANBUS).

It should be appreciated that the controller 108 may correspond to an existing controller(s) of the implement 10 and/or the vehicle 12, itself, or the controller 108 may correspond to a separate processing device. For instance, in one embodiment, the controller 108 may form all or part of a separate plug-in module that may be installed in association with the implement 10 and/or the vehicle 12 to allow for the disclosed systems to be implemented without requiring additional software to be uploaded onto existing control devices of the implement 10 and/or the vehicle 12. It should also be appreciated that the functions of the controller 108 may be performed by a single processor-based device or may be distributed across any number of processor-based devices, in which instance such devices may be considered to form part of the controller 108. For instance, the functions of the controller 108 may be distributed across multiple application-specific controllers, such as a navigation controller, an engine controller, an implement controller, and/or the like.

Moreover, the system 100 may include a remote database server 116 configured to store data associated with soil clod size and/or the soil surface residue coverage data of the field across which the implement 10 is traveling. In general, the remote database server 116 may comprise any suitable processor-based device known in the art, such as a computing device or any suitable combination of computing devices. Thus, in several embodiments, the remote database server 116 may include one or more processor(s) 118 and associated memory device(s) 120 configured to perform a variety of computer-implemented database server functions. Such memory device(s) 120 may generally be configured to store suitable computer-readable instructions that, when implemented by the processor(s) 118, configure the remote database server 116 to perform various computer-implemented database server functions.

Furthermore, the remote database server 116 may also include various other suitable components, such as a communications circuit or module, a network interface, one or more input/output channels, a data/control bus and/or the like, to allow remote database server 116 to be communicatively coupled to the controller 108. For instance, as shown in FIG. 4, a communicative link or interface 122 (e.g., a data bus) may be provided between the remote database server 116 and the controller 108 to allow the remote database server 116 and the controller 108 to communicate via any suitable communications protocol (e.g., Wi-Fi, 3G, 4G, LTE, and/or the like).

Additionally, the remote database server 116 may located at any suitable location that is remote or otherwise spaced apart from the implement 10 and the vehicle 12. For example, in one embodiment, the remote database server 116 may be located at a farm management office or facility. However, in alternative embodiments, the remote database server 116 may be located at any other suitable location.

In several embodiments, the controller 108 may be configured to control the operation of the implement 10 such that the implement 10 performs a non-soil working operation on the field. More specifically, as the vehicle 12 tows the implement 10 across the field in the direction of the travel 14, the controller 108 may be configured to control the operation of one or more components of the implement 10 such that the implement 10 performs a non-soil working operation on the field. In one embodiment, the non-soil-working operation may correspond to a spraying operation. In such an embodiment, the controller 108 may be configured to control the operation of one or more components of the implement 10 (e.g., the nozzles 50 and/or the associated pumps) such that an agricultural substance (e.g., a pesticide, a fungicide, a rodenticide, a herbicide, a fertilizer, or a nutrient) is dispensed onto the field. In another embodiment, the non-soil-working operation may correspond to a baling operation. In such an embodiment, the controller 108 may be configured to control the operation of one or more components of the implement 10 (e.g., drive roller 82, the sledge rollers 95, the pickup 97, the floor roller 98, and/or the starter roller 99) such that the implement 10 collects crop material present on the field surface and forms a bale from such crop material. However, in alternative embodiments, the controller 108 may be configured to control the operation of any other suitable components of the implement 10 such that the implement 10 performs a non-soil-working operation on the field.

Additionally, in several embodiments, the controller 108 may be configured to determine a soil clod size of the field and/or a soil surface residue coverage of the field across which the implement 10 is traveling. As described above, the implement 10 may include one or more non-contact-based sensors 102, with each non-contact-based sensor 102 configured to capture data of a portion of the field within its field of view. In this regard, as the implement 10 travels across the field to perform the non-soil-working operation thereon, the controller 108 may be configured to receive data from the non-contact-based sensor(s) 102 (e.g., via the communicative link 114). Thereafter, the controller 108 may be configured to process/analyze the received data to determine or estimate the value(s) of the soil clod size and/or the soil surface residue coverage of the field at the current location of the implement 10. For instance, the controller 108 may include a look-up table(s), suitable mathematical formula, and/or algorithms stored within its memory device(s) 112 that correlates the received sensor data to the soil clod size and/or the soil surface residue coverage of the field.

It should be appreciated that the determined soil clod size values may correspond to any suitable parameter(s) associated with the size of the soil clods present on the surface of the field. For example, the soil clod size values may correspond to the average soil clod size, the range or distribution of soil clod sizes, and/or the like. Moreover, it should be appreciated that the determined soil surface residue coverage values may correspond to any suitable parameter(s) associated with the amount and/or type of residue present on the surface of the field. For example, the soil surface residue coverage values may correspond to the percent residue coverage of the surface of the field, the percent coverage of residue bunches, and/or the like.

Furthermore, the controller 108 may be configured to generate a field map(s) illustrating the soil clod size and/or soil surface residue coverage values at various locations within the field. More specifically, the controller 108 may be configured to geo-locate the position of the implement 10 based on data received from the location sensor 106. For example, the controller 108 may associate each determined soil clod size and/or soil surface residue coverage value with the position in the field where the determination was made. Thereafter, the controller 108 may be configured to generate one or more field maps (e.g., a graphical field map(s)) illustrating the soil clod size and/or soil surface residue coverage values at various positions within the field. For instance, the controller 108 may be configured to execute one or more algorithms stored within its memory 112 that generate the field map(s) based on the determined soil clod size and/or soil surface residue coverage values and the data received from the location sensor 106 (e.g., via the communicative link 114).

In addition, the controller 108 may be configured to transmit the determined soil clod size and/or soil surface residue coverage values and/or the associated field map(s) to a remote device. For example, as indicated above, in one embodiment, the system 100 may include a remote database server 116. As such, the controller 108 may be configured to transmit (e.g., via the communicative link 122) the determined soil clod size and/or soil surface residue coverage values and/or the associated field map(s) to the remote database server 116 for storage within its memory device(s) 120. Such transmission may occur continuously or periodically during the performance of the non-soil-working operation or upon completion of the non-soil-working operation. The stored field map(s) may subsequently transmitted to a tillage implement for use during a tillage operation and/or a planting implement for use during a planting operation. However, in alternative embodiments, the controller 108 may be configured to transmit the determined soil clod size and/or soil surface residue coverage values and/or the associated field map(s) to any other suitable remote device(s), such as a laptop, a tablet, a Smartphone, another agricultural implement, and/or the like.

It should be appreciated that the value(s) of the soil clod size and/or the soil surface residue coverage of the field and/or the associated field maps may be used to control the operation of agricultural implements performing subsequent operations (e.g., tillage or planting operations) on the field. As mentioned above, the non-soil-working operation (e.g., a spraying or baling operation) may be performed after a harvesting operation and prior to a subsequent tillage or planting operation. In this respect, the determined value(s) and/or associated maps may provide an indication of the soil clod size and/or the soil surface residue coverage of the field prior to a subsequent tillage or planting operation. In this respect, such determined value(s) and/or associated maps may allow for proactive (as opposed to reactive) control of the tillage and planting implements performing these subsequent operations.

Figure 5:
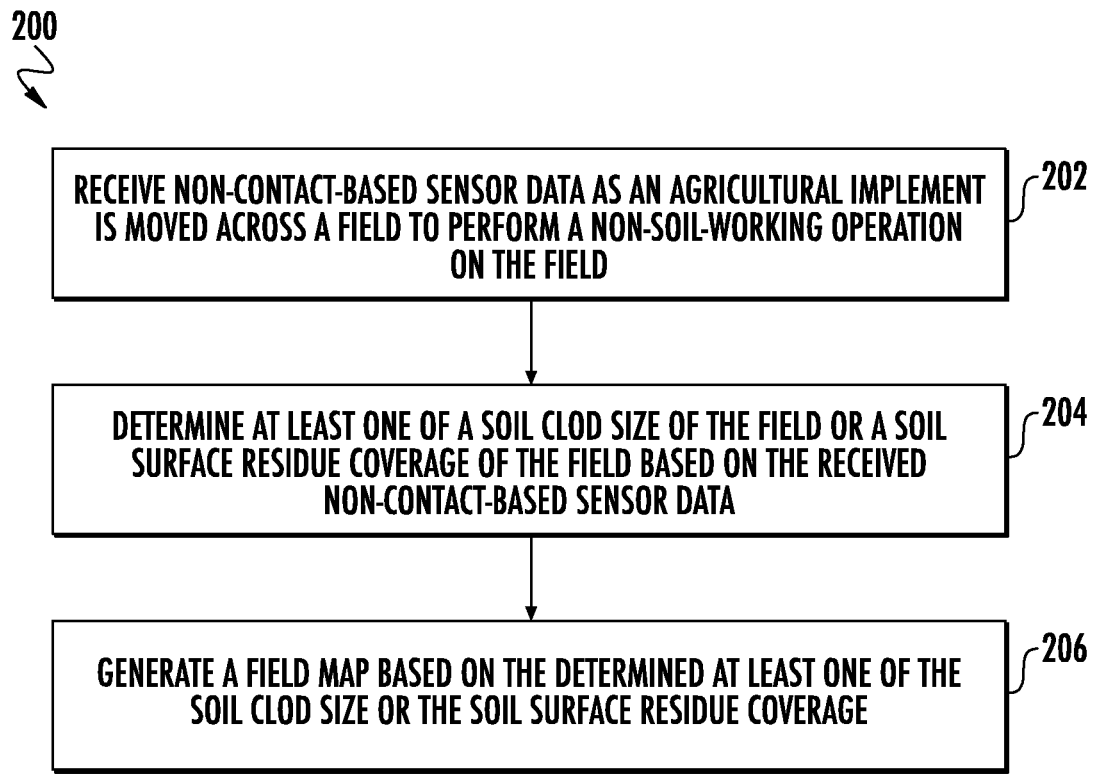
FIG. 5 illustrates a flow diagram of one embodiment of a method for determining the soil clod size or soil surface residue coverage of a field in accordance with aspects of the present subject matter.

Referring now to FIG. 5, a flow diagram of one embodiment of a method 200 for determining soil clod size or soil surface residue coverage of a field is illustrated in accordance with aspects of the present subject matter. In general, the method 200 will be described herein with reference to the agricultural implement 10, the work vehicle 12, and the system 100 described above with reference to FIGS. 1-4. However, it should be appreciated by those of ordinary skill in the art that the disclosed method 200 may generally be implemented with any agricultural implement having any suitable implement configuration, with any work vehicle having any suitable vehicle configuration, and/or within any system having any suitable system configuration. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 5, at (202), the method 200 may include receiving, with one or more computing devices, non-contact-based sensor data as an agricultural implement is moved across a field to perform a non-soil-working operation on the field. For instance, as described above, the controller 108 may be configured to receive data from one or more non-contact-based sensors 102 installed on the agricultural implement 10 as the implement 10 is moved across a field by the work vehicle 12 to perform a non-soil-working operation (e.g., spraying, baling, and/or the like) on the field.

Additionally, at (204), the method 200 may include determining, with one or more computing devices, at least one of a soil clod size of the field or a soil surface residue coverage of the field based on the received non-contact-based sensor data. For instance, as described above, the controller 108 may be configured to determine the soil clod size of the field and/or the soil surface residue coverage of the field based on the data received from the non-contact-based sensor(s) 102.

Moreover, as shown in FIG. 5, at (206), the method 200 may include generating, with the one or more computing devices, a field map based on the determined at least one of the soil clod size or the soil surface residue coverage. For instance, as described above, the controller 108 may be configured to generate a field map(s) based on the determined at least one of the soil clod size or the soil surface residue coverage.

It is to be understood that the steps of the method 200 are performed by the controller 108 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 108 described herein, such as the method 200, is implemented in software code or instructions which are tangibly stored on a tangible computer readable medium. The controller 108 loads the software code or instructions via a direct interface with the computer readable medium or via a wired and/or wireless network. Upon loading and executing such software code or instructions by the controller 108, the controller 108 may perform any of the functionality of the controller 108 described herein, including any steps of the method 200 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A system for determining soil clod size of a field, the system comprising:
   an agricultural implement configured to perform a non-soil-working operation on the field as the agricultural implement is towed across the field;
   a non-contact-based sensor installed on the agricultural implement, the non-contact-based sensor configured to capture data reflected off of a soil surface indicative of a soil clod size of the field; and
   a controller communicatively coupled to the non-contact-based sensor, the controller configured to:
      receive data reflected off of the soil surface from the non-contact-based sensor as the agricultural implement is moved across the field; and
      determine the soil clod size of the field based on the received data;
   wherein the non-soil-working operation comprises a spraying operation or a baling operation; and
   wherein the non-soil-working operation is configured to be performed after a harvesting operation and before a tillage operation.

2. The system of claim 1, wherein the controller is further configured to generate a field map based on the determined soil clod size.

3. The system of claim 2, wherein the controller is further configured to transmit the generated field map to a remote device.

4. The system of claim 1, wherein the controller is further configured to transmit the generated field map to a remote device.

5. The system of claim 1, wherein the non-contact-based sensor comprises a radio detection and ranging (RADAR) sensor.

6. An agricultural implement, comprising:
   a frame;
   a tool supported on the frame, the tool configured to perform a non-soil-working operation on a field as the agricultural implement is towed across the field;
   a non-contact-based sensor configured to capture data reflected off of a soil surface indicative of a soil clod size of the field; and
   a controller communicatively coupled to the non-contact-based sensor, the controller configured to:
      receive data reflected off of the soil surface from the non-contact-based sensor as the agricultural implement is moved across the field; and
      determine the soil clod size of the field based on the received data;
   wherein the non-soil-working operation comprises a spraying operation or a baling operation; and
   wherein the non-soil-working operation is configured to be performed after a harvesting operation and before a tillage operation.

7. The agricultural implement of claim 6, wherein the controller is further configured to generate a field map based on the determined sod clod size.

8. The agricultural implement of claim 7, wherein the controller is further configured to transmit the generated field map to a remote device.

9. A method for determining soil clod size of a field, the method comprising:
   receiving, with the one or more computing devices, non-contact-based sensor data reflected off of a soil surface, as an agricultural implement is moved across the field to perform a non-soil-working operation on the field;
   determining, with one or more computing devices, the soil clod size of the field based on the received non-contact-based sensor data reflected off of the soil surface; and
   generating, with the one or more computing devices, a field map based on the determined soil clod size;
   wherein the non-soil-working operation comprises a spraying operation or a baling operation; and
   wherein the non-soil-working operation is configured to be performed after a harvesting operation and before a tillage operation.

10. The method of claim 9, further comprising:
    transmitting, with the one or more computing devices, the generated field map to a remote device.

11. The method of claim 9, wherein the non-contact-based sensor data comprises vision data.

12. The method of claim 9, wherein the non-contact-based sensor comprises radio detection and ranging (RADAR) data.

* * * * *